No. 791,863. PATENTED JUNE 6, 1905.
M. BAUER.
DEVICE FOR THE PRODUCTION OF THE CIRCULATION OF WATER IN WARM WATER BAGS.
APPLICATION FILED AUG. 2, 1904.
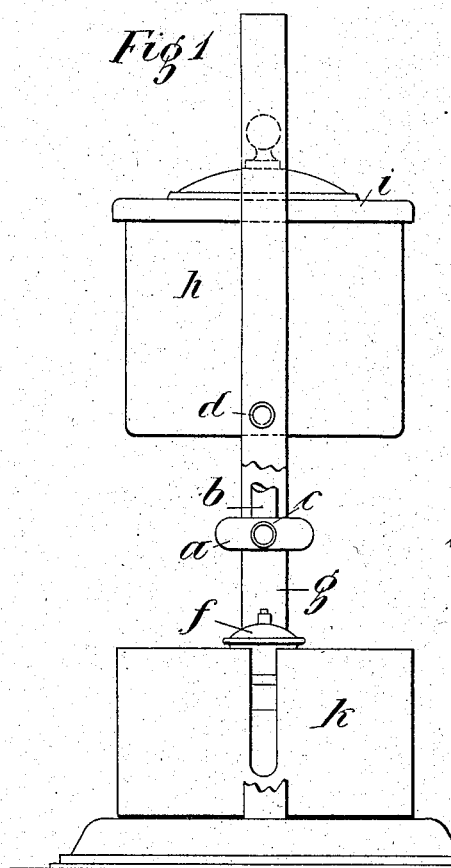
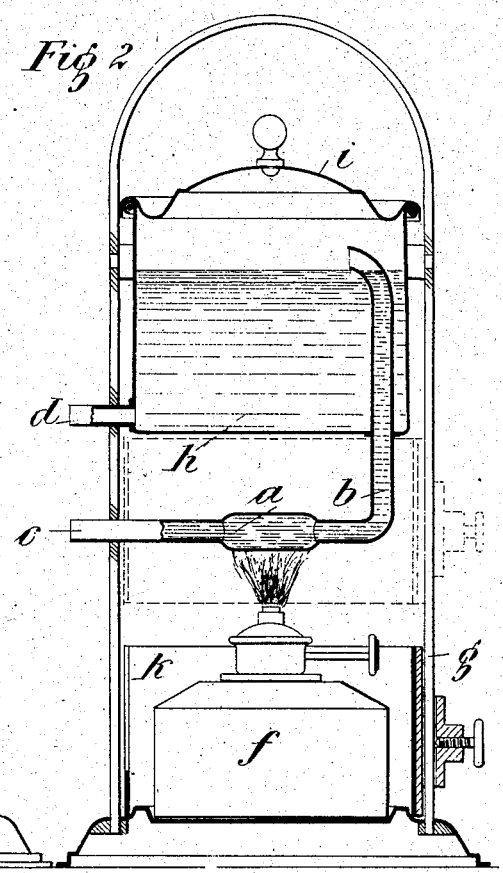
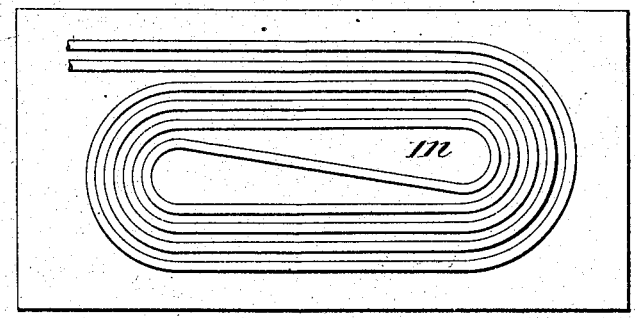

No. 791,863. Patented June 6, 1905.

UNITED STATES PATENT OFFICE.

MORIZ BAUER, OF VIENNA, AUSTRIA-HUNGARY.

DEVICE FOR THE PRODUCTION OF THE CIRCULATION OF WATER IN WARM-WATER BAGS.

SPECIFICATION forming part of Letters Patent No. 791,863, dated June 6, 1905.

Application filed August 2, 1904. Serial No. 219,243.

*To all whom it may concern:*

Be it known that I, MORIZ BAUER, a subject of the Emperor of Austria-Hungary, residing in Vienna, Austria-Hungary, have invented certain new and useful Improvements in Devices for the Production of the Circulation of Water in Warm-Water Bags, of which the following is an exact, full, and clear description.

The present invention relates to devices for producing the circulation of the water in warm-water bags or cushions serving to give heat to patients and serving other medical purposes.

The main feature of said device consists in a tube ending at about the level of a water vessel which is connected with the conduit in the bag or cushion, said tube ascending from a small vessel at the other end of said conduit being exposed to the direct action of a flame.

In the accompanying drawings, Figure 1 is a side elevation of the new device, partly broken away; and Fig. 2 is a side elevation, partly in section, taken at a right angle to Fig. 1. Fig. 3 indicates the bag or cushion containing the conduit for the water.

In a suitable portable frame a small closed vessel $a$ is so arranged that it can be strongly heated by a lamp, such as $f$. Said vessel $a$ is in free communication with a pipe or nipple $c$, to which one end of a water conduit or coil can be connected, and with a bent pipe $b$, the vertical branch of which is passed through the bottom of a water-reservoir $h$, the latter being provided with a nipple $d$, to which the other end of the conduit or coil can be connected. The upper end of the tube $b$, which is slightly curved, as shown in Fig. 2, ascends through the body of water in the reservoir and ends at or above the level of the water, the reservoir $h$ being closed by a cover $i$.

The lamp $f$ is surrounded by a jacket $k$ in the shape of a cylinder, open at top and bottom, which can be moved into the position indicated in Fig. 2 in dotted lines by sliding a screw-clamp, with which it is provided, along the standard $g$ of the frame. A slot $k'$ opposite said screw-clamp permits the cylinder $k$ to go up in close proximity with the reservoir $h$, the pipe $c$ entering said slot, so that the heat from the lamp, after its direct action upon the vessel $a$, strikes the bottom and sides of the reservoir $h$ before it escapes.

In using the described device water is poured into the reservoir $h$ till the conduit $m$, which is usually placed into a water-bag, is filled and until the level of the water in the reservoir $h$ almost rises to the end of the tube $b$. Now the lamp $f$ is lighted, and the flame will immediately evaporate the water in the small vessel $a$, so that steam and water will be thrown out through tube $b$ into the reservoir $h$. The equilibrium being thus disturbed is at once restored by the corresponding amount of water entering through the end of the conduit $c$ and again filling the vessel $a$ and the tube $b$, so that the heat of the flame can immediately repeat the action, as described. Thus after a short time a periodically-repeated ejection of the water in the tube $b$ occurs in such a manner that the water in the reservoir $h$, which is slowly heated by the ejections from the tube $b$ and the vessel $a$, will pass into the conduit $d$ and will return into the vessel $a$ after its circulation through the coil in the water-bag. By regulating the size of the flame the circulation of the water can be adjusted, and the heat of the cushion can be made more or less intense and can be easily kept at constant temperature, so that the water-bag is supplied with water of a constant temperature for many hours without making any other control necessary.

Having thus described my invention, what I claim is—

In a device for producing a circulation of water in a water-bag, a water-reservoir, a support therefor, a small water vessel beneath the reservoir, heating means for said vessel, a tube rising from the vessel to the level of the water within the reservoir, a cylinder surrounding the heating means and capable of vertical adjustment, a water-bag, and conduits connecting the bag with the reservoir and vessel respectively.

In testimony whereof I hereunto affix my signature in presence of two witnesses.

MORIZ BAUER.

Witnesses:
 ISIDOR FISCHER,
 ALVESTO S. HOGUE.